US008932968B2

(12) United States Patent
Lee et al.

(10) Patent No.: US 8,932,968 B2
(45) Date of Patent: Jan. 13, 2015

(54) CERAMIC FIBER COMPOSITION WHICH IS SOLUBLE IN SALT

(75) Inventors: Jin Heuk Lee, Gyeonggi-do (KR); Si Moo Lee, Gyeonggi-do (KR); Hong Kyeom Kim, Gyeonggi-do (KR); Won Sik Jung, Gyeonggi-do (KR)

(73) Assignee: KCC Corporation, Seoul (KR)

( * ) Notice: Subject to any disclaimer, the term of this patent is extended or adjusted under 35 U.S.C. 154(b) by 180 days.

(21) Appl. No.: 13/509,915

(22) PCT Filed: Nov. 17, 2010

(86) PCT No.: PCT/KR2010/008129
§ 371 (c)(1),
(2), (4) Date: May 15, 2012

(87) PCT Pub. No.: WO2011/065698
PCT Pub. Date: Jun. 3, 2011

(65) Prior Publication Data
US 2012/0231274 A1 Sep. 13, 2012

(30) Foreign Application Priority Data
Nov. 27, 2009 (KR) ........................ 10-2009-0115682

(51) Int. Cl.
C03C 13/00 (2006.01)
C03C 13/06 (2006.01)
C04B 35/622 (2006.01)

(52) U.S. Cl.
CPC ............. *C03C 13/00* (2013.01); *C04B 35/6224* (2013.01); *C04B 35/62245* (2013.01); *C03C 2213/02* (2013.01); *C04B 2235/3201* (2013.01); *C04B 2235/3206* (2013.01); *C04B 2235/3208* (2013.01); *C04B 2235/3217* (2013.01); *C04B 2235/3244* (2013.01); *C04B 2235/3409* (2013.01); *C04B 2235/5264* (2013.01); *C04B 2235/9607* (2013.01)
USPC ............................................. 501/35; 501/36

(58) Field of Classification Search
USPC ................................. 501/35, 36, 72
See application file for complete search history.

(56) References Cited

U.S. PATENT DOCUMENTS

| 5,332,699 | A | * | 7/1994 | Olds et al. ................. 501/36 |
| 5,714,421 | A | | 2/1998 | Olds et al. |
| 5,811,360 | A | * | 9/1998 | Jubb ............................. 501/35 |
| 5,994,247 | A | * | 11/1999 | Jubb et al. .................... 501/36 |
| 6,030,910 | A | | 2/2000 | Zoitos et al. |
| 6,037,284 | A | * | 3/2000 | Holstein et al. ............... 501/35 |
| 2002/0032116 | A1 | * | 3/2002 | Jubb et al. .................... 501/36 |
| 2003/0181130 | A1 | | 9/2003 | Shin et al. |
| 2006/0094583 | A1 | | 5/2006 | Freeman et al. |
| 2009/0042030 | A1 | | 2/2009 | Douce et al. |

FOREIGN PATENT DOCUMENTS

| EP | 1179513 A1 | 2/2002 |
| EP | 1 323 687 | 7/2003 |
| EP | 2327667 A1 | 6/2011 |
| JP | 1996-506561 | 7/1996 |
| JP | 1996-511760 | 12/1996 |
| JP | 2000-512969 | 10/2000 |
| JP | 2001-270737 | 10/2001 |
| WO | WO 95/31410 | 11/1995 |
| WO | WO 95/35265 | 12/1995 |
| WO | WO 97/49643 | 12/1997 |
| WO | WO 2006/048610 | 5/2006 |

OTHER PUBLICATIONS

Brow R.K, CER 103 Notes: Shelby Chapter 5 Glass Structure (1), http://web.mst.edu/~brow/PDF_structure1.pdf, accessed Jul. 23, 2014.*
Office Action for RU 2012125634, mailed Jul. 19, 2103, 3 pages (English Translation).
Dr. Uwe Stilkenbohmer, response to European office action, available on EPO Register during February and available today, 2013.
International Search Report mailed Aug. 23, 2011 for International application No. PCT/KR2010/008129.
Glass (2014) Wikipedia, the free encyclopedia.

* cited by examiner

*Primary Examiner* — Karl Group
*Assistant Examiner* — Elizabeth A Bolden
(74) *Attorney, Agent, or Firm* — Swanson & Bratschun, L.L.C.

(57) ABSTRACT

A biodegradable ceramic fiber composition for a high-temperature thermal insulator is provided. The composition includes: 58 to 67% by weight $SiO_2$, 26 to 34% by weight CaO, 2 to 8% by weight MgO, 0 to 1% by weight $Al_2O_3$, 0 to 5% by weight $B_2O_3$, 0 to 3% by weight $Na_2O+K_2O$, and 1% by weight or less impurities selected from $TiO_2$ and $Fe_2O_3$. The composition has a linear thermal contraction coefficient of 3% or less (when maintained at 1100° C. for 24 hours) and a dissolution rate constant of 700 $ng/cm^2 \cdot hr$ or more in a synthetic body fluid. When compared to known biodegradable ceramic fibers, the ceramic fiber composition also has a significantly improved solubility in a synthetic body fluid so that it can easily be dissolved and removed even when inhaled into the human lungs, thereby reducing harmfulness to the human body.

6 Claims, No Drawings

CERAMIC FIBER COMPOSITION WHICH IS SOLUBLE IN SALT

CROSS-REFERENCE TO RELATED APPLICATION

This application is a 35 U.S.C. §371 national phase application of PCT/KR2010/008129 (WO 2011/065698), filed on Nov. 17, 2010, entitled "Ceramic Fiber Composition which is Soluble in Salt", which application claims priority to and the benefit of Korean Patent Application No. 2009-0115682, filed Nov. 27, 2009, the disclosure of which is incorporated herein by reference in its entirety.

BACKGROUND

1. Field of the Invention

The present invention relates to a salt-soluble ceramic fiber composition for a high-temperature thermal insulator, and, more particularly, to a ceramic fiber composition for a high-temperature thermal insulator having excellent salt-solubility, wherein the fiber composition includes $SiO_2$ as a network-forming oxide, CaO as a network-modifying oxide, MgO, $Al_2O_3$ as an intermediate oxide, $B_2O_3$ serving as both a flux and a network oxide in the composition, $Na_2O$ serving as a flux, and $K_2O$ at a proper ratio so as to prepare a composition having improved solubility of a fiber composition in an artificial saline body fluid. Also, the present invention relates to a composition in which a content of the sum of $B_2O_3$ and $Na_2O+K_2O$ present as the flux is controlled to show constant high-temperature heat resistance, and which has improved solubility (biodegradability) in a saline body fluid compared to a conventional salt-soluble ceramic fiber composition and an increased production yield in a high-temperature production process.

2. Discussion of Related Art

Ceramic fibers have been used as materials such as heat-insulating materials, cold-insulating materials, thermal insulators, soundproof materials, sound-absorbing materials and filtering materials because of their low thermal conductivity and long and thin shape.

The term "fiber for a fire-resistant thermal insulator" used as a thermal insulator generally refers to a fire-resistant fiber that can be used at a temperature of 600° C. or higher at which conventional mineral wool is used. Fibrous blanket thermal insulators used at a high temperature are classified into 5 types: type 1 (732° C.) to type 5 (1,649° C.) according to the ASTM C982, based on the thermal contraction coefficients measured at a high temperature. The "safe use temperature" of a conventional fiber is defined as a temperature at which a fiber has a linear thermal contraction coefficient of 5% or less when maintained at a corresponding temperature for 24 hours.

In recent years, the most widely used fiber for a fire-resistant thermal insulator is an $Al_2O_3$—$SiO_2$ (RCF-AS)-based fiber, the safe use temperature of which is in a range of 1100 to 1260° C. Conventional known techniques associated with the $Al_2O_3$—$SiO_2$-based fiber are as follows. U.S. Pat. Nos. 2,873,197 and 4,555,492 disclose an $Al_2O_3$—$SiO_2$—$ZrO_2$ (RCF-ASZ)-based fiber prepared by adding a certain amount of a $ZrO_2$ ingredient to an $Al_2O_3$—$SiO_2$-based composition, wherein a safe use temperature of the fiber increases to 1430° C.

U.S. Pat. No. 4,055,434 discloses a fiber composition prepared by adding up to 16% burned dolomite to an $Al_2O_3$—$SiO_2$-based composition as CaO and MgO sources, wherein the fiber has a heat-resistant temperature of 760 to 1100° C.

U.S. Pat. No. 3,687,850 discloses that a silica fiber including 76 to 90% $SiO_2$ and 4 to 8% $Al_2O_3$ has a heat resistance of 1093° C. without precipitation of crystals, wherein the silica fiber is prepared by adding an acid to a fiber composition composed of $SiO_2$, $Al_2O_3$, $R_2O$, RO and $B_2O_3$ and dissolving the RO, $R_2O$ and $B_2O_3$ ingredients. However, although the heat resistance and dissolution characteristics in acid are considered in order to prepare the conventional fiber for a fire-resistant thermal insulator, there is no consideration of the dissolution characteristics in a saline solution such as a synthetic body fluid. Also, low solubility in a physiological medium may be caused due to high $Al_2O_3$ content (i.e., 4% or more).

Recently reported data shows that a fiber having low solubility in a physiological medium is inhaled in a finely ground fiber shape and accumulated in the lungs, which leads to damage to the human body. Therefore, there has been ardent research to develop an inorganic fiber composition so as to increase solubility in a physiological medium to minimize possibility of being harmful to the human body and to satisfy high-temperature physical properties as well.

A glass fiber composition easily dissolved in the physiological medium is known as follows. For example, there are a bioabsorbable glass fiber composition including $CaF_2$, ZnO, SrO, $Na_2O$, $K_2O$ and $Li_2O$ in addition to CaO and $P_2O_5$ (U.S. Pat. No. 4,604,097), a fiber composition obtained by adding $P_2O_5$ to a conventional soda lime borosilicate glass fiber composition (International Patent WO92/0781), a fiber composition obtained by adding an increased amount of $B_2O_3$ and other $Na_2O$ to a soda lime borosilicate composition (U.S. Pat. No. 5,055,428), etc. However, these compositions have a disadvantage in that their heat resistance is low because they are composed of composition regions, each of which includes a relatively high content of an $R_2O$ ingredient, there is no mention of the safe use temperature or they are only actually used as a thermal insulator at 350° C. or lower in buildings, and there is a limitation to use as a biodegradable material that can be used at a high temperature.

Also, examples of the fiber composition having excellent solubility in a synthetic body fluid, which can be used as a fire-resistant fiber at a high temperature, are listed as follows. For example, there are a modified fiber composition having improved solubility in a synthetic body fluid and enhanced fire resistance by reducing a content of $Al_2O_3$ and increasing a content of MgO in a conventional mineral wool including components such as CaO, MgO, $SiO_2$ and $Al_2O_3$ (International Patent WO87/05007), a fiber composition obtained by selectively adding components such as MgO, alkali oxide, $Al_2O_3$, $ZrO_2$, $B_2O_3$ and $Fe_2O_3$ to $SiO_2$ and CaO (International Patent WO89/12032), a fiber composition having a use temperature of 800° C. to 1000° C. by reducing a content of $Al_2O_3$ while maintaining contents of $SiO_2$, CaO and MgO (International Patent WO93/15028), etc. However, these compositions may only be used in limited fields in which their maximum safe use temperature is defined as 815° C. to 1000° C. (a linear thermal contraction coefficient of 5% or less when maintained for 24 hours). Also, since the above-described fiber compositions do not include a flux ingredient, it is difficult to avoid deterioration of performances such as production yield and biodegradability.

Also, examples of the fiber composition having a maximum safe use temperature of 1260° C. and showing excellent solubility in a synthetic body fluid are as follows. International Patent WO94/15883 discloses a fiber composition region in which the remaining $SiO_2$ content accounts for 21.8 mol % or more by adding $Al_2O_3$ and $ZrO_2$ to $SiO_2$, CaO and MgO, but it is difficult or impossible to form a fiber in the composition regions having high $SiO_2$ contents of 70.04 mol %, 73.09 mol % and 78.07 mol % (high contents of non-fibrous materials). International Patent WO97/16386 discloses a biodegradable fiber composition having a linear thermal contraction coefficient at 1,260° C. of 4.5% that is easily formed into fiber, wherein a composition region having a high content of $SiO_2$ includes MgO and $SiO_2$ as major ingredients, has a CaO content of 1% or less and includes 0 to 2% of $Al_2O_3$, $ZrO_2$ and $B_2O_3$, which are added as other viscosity modifiers. However, a fiber product having such a composition region has high thermal conductivity due to thick average fiber size and a relatively high linear thermal contraction coefficient at a safe use temperature (3% or more). Because an excessive content of $SiO_2$ is used to increase the safe use temperature, the fiber compositions have much lower biodegradability than the fiber composition prepared according to the present invention, and their production yield is decreased, a large amount of dust is generated upon fiber production, and product qualities such as a tensile strength may be degraded.

Representative examples of the currently developed ceramic fiber compositions have been described above. The desired physical properties of the ceramic fiber compositions are listed based on the above-mentioned techniques known in the art, as follows.

A method of forming a ceramic fiber composition into a fiber includes a blowing process of forming a fiber using compressed air or a compressed steam and a spinning process of forming a fiber by dropping a molten material on a cylinder that is rotating at a high speed. An ideal viscosity of the fiber composition which is suitable to form a fiber using the spinning or blowing process should be low, for example, in a range of 20 to 100 poises, or be similar to or not highly different from that of a conventional $SiO_2$—$Al_2O_3$-based composition. When the viscosity at a fiber-forming temperature is too high, a diameter of the fiber is increased, which leads to generation of a large amount of a thick non-fibrous material (shot). On the other hand, when the viscosity is excessively low, a fiber becomes short and thin which leads to generation of a large amount of a fine non-fibrous material (shot). In general, since the viscosity of a glass melt solution depends on glass compositions and temperatures, the compositions should be properly designed to maintain a suitable fiber-forming viscosity. Also, since high-viscosity compositions need to be formed into fiber at a higher temperature, their viscosity should be controlled around a fiber-forming temperature.

Also, a ceramic fiber used for high-temperature insulation should have high thermal resistance and also show excellent durability even when thermal stress is repeatedly applied to a furnace material. Therefore, even when the ceramic fiber is exposed to heat corresponding to the use temperature, its physical properties should be hardly changed. The use temperature of the ceramic fiber is associated with contraction at the use temperature.

The contraction of a fiber product is affected by the viscosity of glassy fiber composition at a high temperature, the kind and amount of crystals generated and growing when exposed to heat upon use of a product, the crystal precipitation temperature and the high-temperature viscosity of a glassy phase remaining after crystal precipitation. Since crystals precipitated at a high temperature have a higher specific gravity than a conventional glassy fiber, stress is caused in a crystal interface due to the crystal precipitation and growth, and thus fibers are cut or deformed due to the stress, which leads to contraction of the fiber. When the fiber is present as a glassy phase without precipitation of crystals at a high temperature, the viscosity of the fiber like glass is also gradually decreased at a relatively low temperature, which results in an increase in contraction of the fiber. Also, even when the glassy phase remaining after the crystal precipitation has a low high-temperature viscosity, the fiber contraction is increased due to liquid phase sintering and deformation caused by the viscous flow. A fiber prepared from a composition having a low contraction rate at a high temperature should have a suitable crystal precipitation quantity and rate and a proper precipitation temperature. Also, the solubility of the ceramic fiber in a synthetic body fluid should be hardly changed even when the ceramic fiber is exposed to a high temperature. Therefore, it is very important to select a composition which has high solubility in a synthetic body fluid, is easily melted and formed into fiber, and has a low linear thermal contraction coefficient at a high temperature.

Furthermore, a glass wool, a mineral wool and a ceramic fiber has excellent solubility in a synthetic body fluid compared to an asbestos fiber which has been known as a carcinogenic substance, but have not been proved to be harmful to human beings. The toxicological test results using animal tests indicate that the solubility of a fiber in a synthetic body fluid is particularly correlated with harmfulness in the animal tests. However, it was reported that a fiber having a dissolution rate constant ($K_{dis}$) of 100 ng/cm²·hr or more does not develop fibrosis or tumor in an animal inhalation test (Inhalation Toxicology, 12:26 to 280, 2000, Estimating in vitro glass fiber dissolution rate from composition, Walter Eastes). Dissolution rate constants ($K_{dis}$) of currently developed biodegradable fibers are in a range of 300 to 600 ng/cm²·hr. However, the present invention aims to provide a fiber composition capable of minimizing harmfulness to the human body compared to conventional biodegradable ceramic fibers by setting a reference value of the solubility of a ceramic fiber composition in a synthetic body fluid to 700 ng/cm²·hr or more.

EFFECTS OF THE INVENTION

The solubility of the high-temperature insulating biodegradable ceramic fiber (produced according to the composition of the present invention) in a synthetic body fluid is exceptionally improved compared to that of ceramic fiber and biodegradable ceramic fiber. So, it is easily dissolved and removed when inhaled into the lungs and therefore reduces the harmfulness to the body. Also, since it has a thermal conductivity coefficient (maintain at 1100° C. for 24 hours) less than 3% along with its excellent biodegradability, it has the equivalent characteristics of the conventional high-temperature insulator in regards to thermal and mechanical properties. Additionally, by including an adequate amount of flux, the content of non-fibrous material that can be generated when producing the ceramic fiber can be reduced and the production yield can be remarkably improved.

SUMMARY OF THE INVENTION

The present invention is directed to providing a biodegradable ceramic fiber composition which is capable of minimizing harmfulness to the human body even when a ceramic fiber is inhaled into the human body, being used at a high temperature since it has excellent thermal characteristics such as heat resistance and being used to easily form a fiber using conventional manufacturing equipment, and is economically effective due to improved yield.

One aspect of the present invention provides a ceramic fiber having excellent high-temperature physical properties and improved biodegradability by adjusting a network-forming oxide ($SiO_2$), which is used as a major ingredient of an inorganic fiber for a high-temperature thermal insulator, network-modifying oxides (CaO and MgO), an intermediate oxide ($Al_2O_3$), $B_2O_3$ serving as both a flux and a network oxide, and fluxes ($Na_2O$ and $K_2O$) at a proper ratio to prepare a fiber composition. Particularly, one aspect of the present invention provides a ceramic fiber which has a significantly increased dissolution rate constant under control of the contents of $B_2O_3$ and $Na_2O$ compared to a conventional biodegradable ceramic fiber, and is economically effective due to improved production yield.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The present invention is directed to providing a biodegradable ceramic fiber composition for a high-temperature thermal insulator including 58 to 67% by weight $SiO_2$, 26 to 34% by weight CaO, 2 to 8% by weight MgO, 0 to 1% by weight $Al_2O_3$, 0 to 5% by weight $B_2O_3$, 0 to 3% by weight $Na_2O+K_2O$, and 0 to 1% by weight impurities selected from $TiO_2$ and $Fe_2O_3$. Here, the biodegradable ceramic fiber composition is characterized in that it has a linear thermal contraction coefficient at 1100° C. of 3% or less and a dissolution rate constant of 700 ng/cm²·hr or more in a synthetic body fluid.

Hereinafter, the biodegradable ceramic composition for a high-temperature thermal insulator according to the present invention will be described in detail.

As a major ingredient of the ceramic fiber according to the present invention, $SiO_2$ is preferably present at a content of 58 to 67% by weight, based on the entire content of the fiber composition. When the content of $SiO_2$ is less than 58% by weight, heat resistance, which is one of the most basic physical properties of the ceramic fiber for a high-temperature thermal insulator, is rapidly degraded, and a non-fiber formation rate is increased due to a decrease in high-temperature viscosity, which leads to degradation of productivity. On the other hand, when the content of $SiO_2$ exceeds 67% by weight, a fiber-forming viscosity of the composition is increased with an increase in fiber diameter upon production of a fiber, and an amount of a generated non-fibrous material (shot) is also increased at the same time, thereby causing quality degradation of physical properties such as product texture and tensile strength.

Also, the biodegradable ceramic fiber composition for a high-temperature thermal insulator according to the present invention includes certain contents of CaO and MgO as the network-modifying oxides so as to improve solubility of a prepared fiber in a synthetic body fluid. CaO is preferably present at a content of 26 to 34% by weight, based on the entire content of the fiber composition. When the content CaO is less than 26% by weight, the biodegradability of a fiber in a synthetic body fluid may be degraded, whereas, when the content CaO exceeds 34% by weight, an amount of crystals precipitated during fiber production may be increased. Therefore, a relatively lower content of $SiO_2$ in the prepared fiber may cause degradation of high-temperature stability and an increase in linear thermal contraction coefficient. As another network-modifying oxide added to enhance the biodegradability of the fiber, MgO is preferably present at a content of 2 to 8% by weight, and more preferably 4 to 7% by weight, based on the entire content of the fiber composition. When the content of MgO is less than 2% by weight, the biodegradability of a fiber in a synthetic body fluid is degraded, or an inhibitory effect of crystal growth caused by mixed alkali effects upon fiber production may be decreased. On the other hand, when the content of MgO exceeds 8% by weight, a fiber-forming viscosity may be increased and a fiber melting temperature may be lowered since a eutectic point of the fiber composition approaches eutectic points of diopside and wollastonite. Also, in preparation of the fiber composition according to the present invention, a source material that may be purchased at a relatively inexpensive cost, such as dolomite or limestone, may be selectively used as an MgO ingredient instead of pure compounds to achieve the desired effects of the present invention.

According to the present invention, the fiber composition includes $Al_2O_3$ as the intermediate oxide. $Al_2O_3$ is preferably present at a content of 0 to 1% by weight, and more preferably 0.1 to 0.7% by weight, based on the entire content of the fiber composition. When the content of $Al_2O_3$ exceeds 1% by weight, the solubility of a fiber in a synthetic body fluid may be degraded, and a temperature resistance may be lowered.

Also, the fiber composition according to the present invention may further include a glass-forming oxide having a low melting point, such as $B_2O_3$, $Na_2O$ or $K_2O$ or include all the glass-forming oxides to further enhance the solubility of a prepared fiber in a synthetic body fluid. $B_2O_3$ and $Na_2O+K_2O$ may be added at contents of 0 to 5% by weight and 0 to 3% by weight, respectively, and may be preferably added so that the sum of $B_2O_3$ and $Na_2O+K_2O$ can amount to a content of 0.1 to 5% by weight, and more preferably 0.1 to 2.0% by weight.

In particular, when the above-mentioned ingredients, $B_2O_3$ and $Na_2O$, are added, they serve to enhance the productivity and reduce a non-fiber formation rate by lowering the fiber-forming viscosity during production of a ceramic fiber. When the fiber composition is formed into a product, it functions to enhance the biodegradability in a synthetic saline body fluid. Also, $B_2O_3$ serves as a flux in a high-temperature melting process to lower a minor ratio of a fiber-forming process and serves as a structure oxide in a ceramic fiber composition to maintain structural stability.

In addition, the fiber composition according to the present invention should satisfy the requirements according to the following Formula 1 in order to enhance the biodegradability of the fiber composition.

$$1 \leq \text{(percent by weight of MgO)/(percent by weight of sum of } B_2O_3 \text{ and } Na_2O) \leq 23 \qquad \text{Formula 1}$$

When a weight ratio of the components is less than 1 in Formula 1, the fiber composition may not be used for a fire-resistant thermal insulator due to a decrease in heat resistance of a fiber, whereas, when the weight ratio of the components exceeds 23, the fiber-forming viscosity may be increased, and a production yield may be lowered due to an increase in diameter of a fiber.

Also, the biodegradable ceramic fiber composition for a high-temperature thermal insulator according to the present invention may include impurities such as $TiO_2$ and $Fe_2O_3$ at a content of 1% by weight or less, based on the entire content of the fiber composition. The impurities may be incorporated due to the lack of purity of a source material used to prepare the fiber composition. Therefore, when the impurities are present at a content of greater than 1% by weight, a reaction of the fiber components may be inhibited, and the physical properties of a prepared fiber may be degraded.

The ceramic fiber according to the present invention prepared using the fiber composition including the above-described components and their contents has a non-fibrous material (shot) content of less than 40%, an average fiber particle size of 6 μm or less, a linear thermal contraction coefficient of 3% or less (when maintained at 1100° C. for 24 hours), and a dissolution rate constant of 700 ng/cm²·hr or more in a synthetic body fluid. Also, the ceramic fiber according to the present invention is economically effective since it has the excellent characteristics as described above, and may also be prepared using a conventional method of preparing a ceramic fiber.

Meanwhile, the above-mentioned method of forming a ceramic fiber composition of the present invention into fiber may be performed using a conventional method such as a blowing or spinning process. A viscosity range of the fiber composition required to apply the above-mentioned fiber-forming method is a range of 20 to 100 poises. A viscosity of a molten material may be expressed as a function of a temperature and corresponding compositions. Therefore, the viscosity of the molten material having the same compositions depends on the temperature. When a temperature of a melt solution is high during fiber formation, the viscosity may be decreased. On the other hand, when a fiber-forming temperature is low, the viscosity may be increased, which affects the fiber formation. When the viscosity of the fiber composition is too low at a fiber-forming temperature, a prepared fiber becomes short and thin, and an amount of a fine non-fibrous material (shot) may be increased, thereby reducing a fiber-forming yield. Even when the viscosity of the fiber composition is too high, a fiber having a high diameter may be formed, which leads to increased formation of a thick non-fibrous material (shot). Therefore, in order to determine suitable fiber-forming characteristics, the characteristics (a diameter of fiber and a content of a non-fibrous material) of a prepared fiber may be measured in comparison with conventional RCF ($Al_2O_3$—$SiO_2$).

EXAMPLES

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Measurement Method

1. Average particle size of fiber: an average fiber size of a fiber was repeatedly measured 500 times or more under an electron microscope with high magnification (×1000).

2. Content of non-fibrous material: a content of a non-fibrous material was measured according to ASTM C892. That is, a ceramic fiber was thermally treated at 1260° C. for 5 hours, and approximately 10 g of the sample was then weighed with an accuracy of 0.0001 g ($W_0$). Thereafter, the sample was put into a 30-mesh sieve, and passed through the sieve by pressing the sample with a rubber bar. The sample passed through the sieve was sequentially passed through 50-mesh and 70-mesh sieves, and particles of the samples remaining in the respective sieves were then weighed ($W_1$). Then, the content (Ws) of a non-fibrous material was calculated using the following Equation 1.

$$W_s = \frac{W_1}{W_0} \times 100 \qquad \text{Equation 1}$$

In Equation 1, $W_s$ represents a content of a non-fibrous material, $W_0$ represents an initial particle weight, and $W_1$ represents a weight of the remaining particles.

3. Production yield: a ratio of a total amount of a molten material formed into fiber to a total amount of the molten material extruded for a predetermined period of time was calculated using the following Equation 2.

$$\text{Production yield (\%)} = [\text{Total amount of prepared fiber/time}]/[\text{Total amount of extruded molten material/time}] \qquad \text{Equation 2}$$

4. Linear thermal contraction coefficient: The physical properties of a prepared high-temperature and fire-resistant thermal insulator fiber at a high temperature were measured as a linear thermal contraction coefficient, in which a change in length of a formed product at a high temperature was measured. Here, the formed product was formed of a conventionally prepared fiber. In order to measure a linear thermal contraction coefficient of a ceramic fiber, the fiber was prepared into a test sample having a pad shape, which was used in this experiment. First, 220 g of fiber was sufficiently gelled in a 0.2% starch solution, and poured into a mold with a side of 300×200 mm. Then, the gelled fiber was flattened to reduce surface roughness, and drained through the bottom of the mold to manufacture a pad. The pad was sufficiently dried for 24 hours in a 50° C. oven, and cut into test samples having a size of 150×100×25 mm. Then, a material having sufficient heat resistance, such as platinum or ceramic, was used to indicate a measurement point, and a distance between the measurement points was accurately measured using a Vernier caliper. Then, the pad was placed on a furnace, and heated at 1100° C. for 24 hours and 168 hours, and slowly cooled after the heating was complete. Distances between the measurement points of the cooled test samples were measured to compare the measurement results before/after heat treatment of the test samples. Then, a linear thermal contraction coefficient was calculated using the following Equation 3.

$$\text{Linear thermal contraction coefficient (\%)} = \frac{l_0 - l_1}{l_0} \times 100 \quad \text{Equation 3}$$

In Equation 3, $l_0$ represents a minimum distance (mm) between marks of the test samples, and $l_1$ represents a length (mm) between the marks of the test samples after thermal treatment of the test samples.

5. Dissolution rate constant in synthetic body fluid: In order to evaluate the solubility of a prepared fiber in a synthetic body fluid, the solubility in a synthetic body fluid was measured as follows. A specific method used in this experiment is fully described in Law et al. (1990)). The biodegradability of a ceramic fiber in the human body was evaluated on the basis of the solubility of the fiber in the synthetic body fluid. That is, the residence times in the human body were compared based on the solubility, and a dissolution rate constant ($K_{dis}$) was then calculated using the following Equation 4.

$$K_{dis} = \frac{d_0 \rho \sqrt{1 - \frac{M}{M_0}}}{2t} \quad \text{Equation 4}$$

In Equation 4, $d_0$ represents an initial average size of a fiber, $\rho$ represents an initial density of a fiber, $M_0$ represents the initial mass of a fiber, M represents the mass of the fiber remaining after melting, and t represents a test time. The initial mass of the fiber was quantified based on its specific surface area, and measured using a specific surface area meter (BET).

Contents (g) of the components in 1 L of a synthetic body fluid (i.e., a Gamble's solution) used to measure a dissolution rate of a fiber are listed in the following Table 1.

TABLE 1

| Components in synthetic body fluid | Content (g/L) |
|---|---|
| NaCl | 7.120 |
| MgCl$_2$•6H$_2$O | 0.212 |
| CaCl$_2$•2H$_2$O | 0.029 |
| Na$_2$SO$_4$ | 0.079 |

TABLE 1-continued

| Components in synthetic body fluid | Content (g/L) |
|---|---|
| Na$_2$HPO$_4$ | 0.148 |
| NaHCO$_3$ | 1.950 |
| Sodium tartrate•2H$_2$O | 0.180 |
| Sodium citrate•2H$_2$O | 0.152 |
| 90% Lactic acid | 0.156 |
| Glycine | 0.118 |
| Sodium pyruvate | 0.172 |

Each of a ceramic fiber according to the present invention and a conventional inorganic fiber was placed between thin layers, which were arranged between 0.2 ρm-thick polycarbonate membrane filters fixed onto a plastic filter support, and the synthetic body fluid was filtered between the filters to measure a dissolution rate. The synthetic body fluid continued to be adjusted at temperature of 37° C. and a flow rate of 135 ml/day during this experiment, and maintained at a pH value of 7.4±0.1 using a CO$_2$/N$_2$ (5/95%) gas. In order to exactly measure the solubility of a fiber which took place for an extended period of time, ions dissolved in the synthetic body fluid, which was filtered at certain time points (1, 4, 7, 11, 14 and 21 days) while leaching a fiber for 21 days, were analyzed using an inductively coupled plasma spectrometer (ICP). Then, a dissolution rate constant ($K_{dis}$) was calculated from the measurement results using Equation 4.

Experimental Example 1

Non-Fibrous Material and Production Yield

The components and their contents as listed in the following Table 2 were used to prepare ceramic fiber compositions according to a conventional method. Then, a ceramic fiber was prepared using a conventional method of preparing an RCF-based inorganic fiber. An average fiber particle size, a non-fibrous material content and a production yield of the prepared ceramic fiber were measured. The measurement results are listed in the following Table 2.

In Table 2, An Al$_2$O$_3$—SiO$_2$-based fiber (Comparative Example 1) and an Al$_2$O$_3$—SiO$_2$—ZrO$_2$-based fiber (Comparative Example 4) were examples of conventional general ceramic fibers, and an Al$_2$O$_3$—SiO$_2$—CaO—MgO—ZrO$_2$-based fiber (Comparative Example 5) includes the same representative compositions as a biodegradable ceramic fiber generally developed in the art.

TABLE 2

| Components | Examples | | | | | Comparative Examples | | | | |
|---|---|---|---|---|---|---|---|---|---|---|
| (% by weight) | 1 | 2 | 3 | 4 | 5 | 1 | 2 | 3 | 4 | 5 |
| SiO$_2$ | 66.3 | 62.1 | 62.5 | 66.5 | 59.8 | 49.5 | 62.8 | 67.2 | 64.9 | 77.5 |
| CaO | 26.5 | 31.2 | 30.7 | 29.3 | 33.5 | | 31.3 | 20.1 | | 14.9 |
| MgO | 6.5 | 5.6 | 5 | 2.9 | 6 | | 5.2 | 12.5 | | 4.9 |
| Al$_2$O$_3$ | 0.1 | 0.6 | 0.6 | 0.5 | 0.2 | 49.9 | 0.5 | | 19.8 | 0.2 |
| B$_2$O$_3$ | 0.5 | 0.2 | 1.1 | 0.6 | 0.2 | | | | | 0.3 |
| Na$_2$O | | | | | 0.2 | | | | | |
| ZrO$_2$ | | 0.1 | | | | | | | 14.9 | 1.8 |
| Impurities | 0.1 | 0.2 | 0.1 | 0.2 | 0.1 | 0.6 | 0.2 | 0.2 | 0.4 | 0.4 |
| Sum | 100.0 | 100.0 | 100.0 | 100.0 | 100.0 | 100.0 | 100.0 | 100.0 | 100.0 | 100.0 |
| Average particle size (μm) | 3.7 | 3.8 | 3.7 | 3.9 | 3.8 | 3.7 | 3.9 | 3.4 | 3.8 | 4.5 |
| Non-fibrous material (%) | 32 | 30 | 28 | 33 | 31 | 30 | 36 | 40 | 32 | 40 |
| Production yield (%) | 72 | 73 | 77 | 75 | 76 | 80 | 63 | 67 | 52 | 60 |

When a fiber has a large average particle size and a rough cross section, a thermal insulation effect may be generally degraded, and the skin may be stung during its handling. However, the fiber prepared using the composition according to the present invention generally had an average particle size of 3.7 to 3.9 μm. Therefore, the fiber of the present invention may be considered to have good qualities since the average particle size of the fiber was smaller than that of a conventional widely used ceramic fiber having an average particle size of 6 μm. Also, since the fiber had a small average particle size, the fiber prepared using the fiber composition was expected to show excellent thermal insulation effects.

Comparing the contents of the non-fibrous materials, it was seen that the fiber composition according to the present invention included 28 to 33% by weight a non-fibrous material, which was reduced compared to 30 to 40% by weight a non-fibrous material in each of the conventional ceramic fibers (Comparative Examples 1, 4 and 5). A production yield of the ceramic fiber according to the present invention was in a range of 72 to 80%, which was obtained at a similar level compared to the conventional ceramic fibers having a production yield of 52 to 80%.

The ceramic fiber (Comparative Example 2) was prepared using the fiber composition obtained by mixing $SiO_2$, $CaO$ and $MgO$ at the same contents as those of the composition of the present invention, except that the fluxes, $B_2O_3$ and $Na_2O$, were not included in the composition. As a result, it was confirmed that the content of the non-fibrous material was increased to 36%, and the production yield was 63%. When the fluxes were not included as described above, it was confirmed that a fiber-forming process did not operate normally due to an increase in fiber-forming viscosity at a high temperature, thereby causing generation of a large amount of a non-fibrous material and a decrease in production yield.

Experimental Example 2

Linear Thermal Contraction Coefficient and Biodegradability

The fiber compositions of Examples and Comparative Examples as listed in Table 2 were measured for linear thermal contraction coefficient and dissolution rate constant ($K_{dis}$) in a synthetic body fluid. The measurement results are listed in the following Table 3.

When the ceramic fibers prepared using the fiber compositions of Examples 1 to 5 as listed in Table 3 were thermally treated at a high temperature of 1100° C. for 24 hours, their linear thermal contraction coefficients were in a range of 1.2 to 1.5%, a value of which was less than 3% corresponding to a standard level of the high-temperature thermal stability. Even when the ceramic fibers were thermally treated at this temperature for 168 hours, they had a slightly increased linear thermal contraction coefficient, for example, a relatively low linear thermal contraction coefficient of 1.4 to 1.8%. When the conventional ceramic fibers of Comparative Examples 1, 4 and 5 were thermally treated at a high temperature of 1100° C. for 24 hours, they had a linear thermal contraction coefficient of 1.2 to 2.1%, which was similar to those of the ceramic fiber products of the present invention.

Also, it was reported that the heat resistance at a high temperature was generally degraded by addition of the fluxes, $B_2O_3$ and $Na_2O$. However, it was confirmed that the fiber product which did not include the flux as in Comparative Example 2 also had a linear thermal contraction coefficient of 1.2 to 1.5%, but that degradation of the heat resistance was minimized under control of a proper ratio of the flux according to the present invention.

The fiber compositions of Comparative Examples 1 and 4 as listed in Table 3 were conventional RCF-based fiber compositions having a dissolution rate constant of less than 20 ng/cm$^2$·hr, and were expected to show very low biodegradability when their dusts were inhaled into the human body. Unlike these fiber compositions, it was seen that the fiber compositions according to the present invention had a dissolution rate constant of 720 to 920 ng/cm$^2$·hr, and their solubility was highly improved in a body fluid. The fiber composition of Comparative Example 5 developed to manufacture a conventional biodegradable fiber had a dissolution rate constant of 355 ng/cm$^2$·hr, which satisfied the general requirements regarding the biodegradability, but showed ½ to ⅓ lower solubility compared to the fiber compositions of the present invention.

Furthermore, the fiber composition of Comparative Example 2 did not include the fluxes (for example, $B_2O_3$ and $Na_2O$) which were included in the fiber compositions of the present invention. Accordingly, it was confirmed that the fiber

TABLE 3

| Components (% by weight) | Examples | | | | | Comparative Examples | | | | |
|---|---|---|---|---|---|---|---|---|---|---|
| | 1 | 2 | 3 | 4 | 5 | 1 | 2 | 3 | 4 | 5 |
| $SiO_2$ | 66.3 | 62.1 | 62.5 | 66.5 | 59.8 | 49.5 | 62.8 | 67.2 | 64.9 | 77.5 |
| CaO | 26.5 | 31.2 | 30.7 | 29.3 | 33.5 | | 31.3 | 20.1 | | 14.9 |
| MgO | 6.5 | 5.6 | 5 | 2.9 | 6 | | 5.2 | 12.5 | | 4.9 |
| $Al_2O_3$ | 0.1 | 0.6 | 0.6 | 0.5 | 0.2 | 49.9 | 0.5 | | 19.8 | 0.2 |
| $B_2O_3$ | 0.5 | 0.2 | 1.1 | 0.6 | 0.2 | | | | | 0.3 |
| $NaO_2$ | | 0.1 | | | 0.2 | | | | | |
| $ZrO_2$ | | | | | | | | | 14.9 | 1.8 |
| Impurities | 0.1 | 0.2 | 0.1 | 0.2 | 0.1 | 0.6 | 0.2 | 0.2 | 0.4 | 0.4 |
| Sum | 100.0 | 100.0 | 100.0 | 100.0 | 100.0 | 100.0 | 100.0 | 100.0 | 100.0 | 100.0 |
| Linear thermal contraction coefficient (%) 24 hr | 1.2 | 1.4 | 1.3 | 1.2 | 1.5 | 1.2 | 1.2 | 3.2 | 1.1 | 1.3 |
| 168 hr | 1.5 | 1.7 | 1.6 | 1.4 | 1.8 | 1.4 | 1.5 | 3.5 | 1.7 | 2.1 |
| Dissolution rate constant (ng/cm$^2$·hr) | 720 | 850 | 920 | 840 | 880 | 10 | 650 | 600 | 15 | 355 | compositions of the present invention had a solubility constant of 650 ng/cm²·hr, which was decreased compared to a group of conventional fiber compositions having a solubility constant of 720 to 920 ng/cm²·hr. As such, the fluxes, $B_2O_3$ and $Na_2O$, are effective in improving the biodegradability of the ceramic fiber.

As described above, it can be seen that the ceramic fibers according to the present invention as prepared using the compositions prepared in Examples show excellent biodegradability and fiber-forming properties in a synthetic body fluid, and have increased productivity caused by a high fiber-forming yield. Also, it can be seen that the ceramic fibers according to the present invention can be effectively used for a high-temperature thermal insulator since they have a linear thermal contraction coefficient even when they are thermally treated at a high temperature of 1100° C. for 24 hours.

The biodegradable ceramic fiber for a high-temperature thermal insulator prepared using the composition according to the present invention has a significantly improved solubility in a synthetic body fluid, compared to the known ceramic fibers and biodegradable ceramic fibers, so that it can easily be dissolved and removed even when inhaled into the human lungs, thereby reducing harmfulness to the human body. Also, the biodegradable ceramic fiber according to the present invention shows excellent biodegradability and has a low linear thermal contraction coefficient (when maintained at 1100° C. for 24 hours) of less than 3%, and thus shows the same thermal and mechanical properties as the conventional high-temperature thermal insulators. In addition, since the biodegradable ceramic fiber according to the present invention includes a proper amount of a flux, it is possible to reduce a content of a non-fibrous material that may be generated upon production of a ceramic fiber and remarkably improve a production yield.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A biodegradable ceramic fiber composition for a high-temperature thermal insulator comprising:
   62.1 to 66.5% by weight $SiO_2$;
   26 to 34% by weight CaO;
   2.9 to 6.5% by weight MgO;
   0 to 1% by weight $Al_2O_3$;
   0.2 to 1.1% by weight $B_2O_3$;
   0.3 to 1.1% by weight sum of $B_2O_3$, $Na_2O$ and $K_2O$; and
   1% by weight or less sum of $TiO_2$ and $Fe_2O_3$,
   wherein the biodegradable ceramic fiber includes a non-fibrous material (shot) at a content of less than 33% by weight, and has a linear thermal contraction coefficient of 1.4% or less (when maintained at 1100° C. for 24 hours).

2. The biodegradable ceramic fiber composition of claim 1, which satisfies the following Formula 17:

$$1 \leq \text{(percent by weight of MgO)/(percent by weight of sum of } B_2O_3 \text{ and } Na_2O) \leq 23, \quad \text{Formula 1}$$

and
wherein the biodegradable ceramic fiber composition comprises 62.1 to 62.5% by weight $SiO_2$.

3. A biodegradable ceramic fiber for a high-temperature thermal insulator prepared utilizing the fiber composition defined in claim 1,
   wherein the biodegradable ceramic fiber includes a non-fibrous material (shot) at a content of 28 to 33% by weight, and has an average fiber diameter of 6 μm or less.

4. A biodegradable ceramic fiber for a high-temperature thermal insulator prepared utilizing the fiber composition defined in claim 1,
   wherein the biodegradable ceramic fiber has a linear thermal contraction coefficient of 1.2 to 1.4% (when maintained at 1100° C. for 24 hours) and a dissolution rate constant of 700 ng/cm²·hr or more in a synthetic body fluid.

5. A thermal insulator comprising the ceramic fiber defined in claim 3.

6. A thermal insulator comprising the ceramic fiber defined in claim 4.

* * * * *